(No Model.)
G. B. ST. JOHN.
ROLLING LANDSIDE COLTER.
No. 287,336. Patented Oct. 23, 1883.
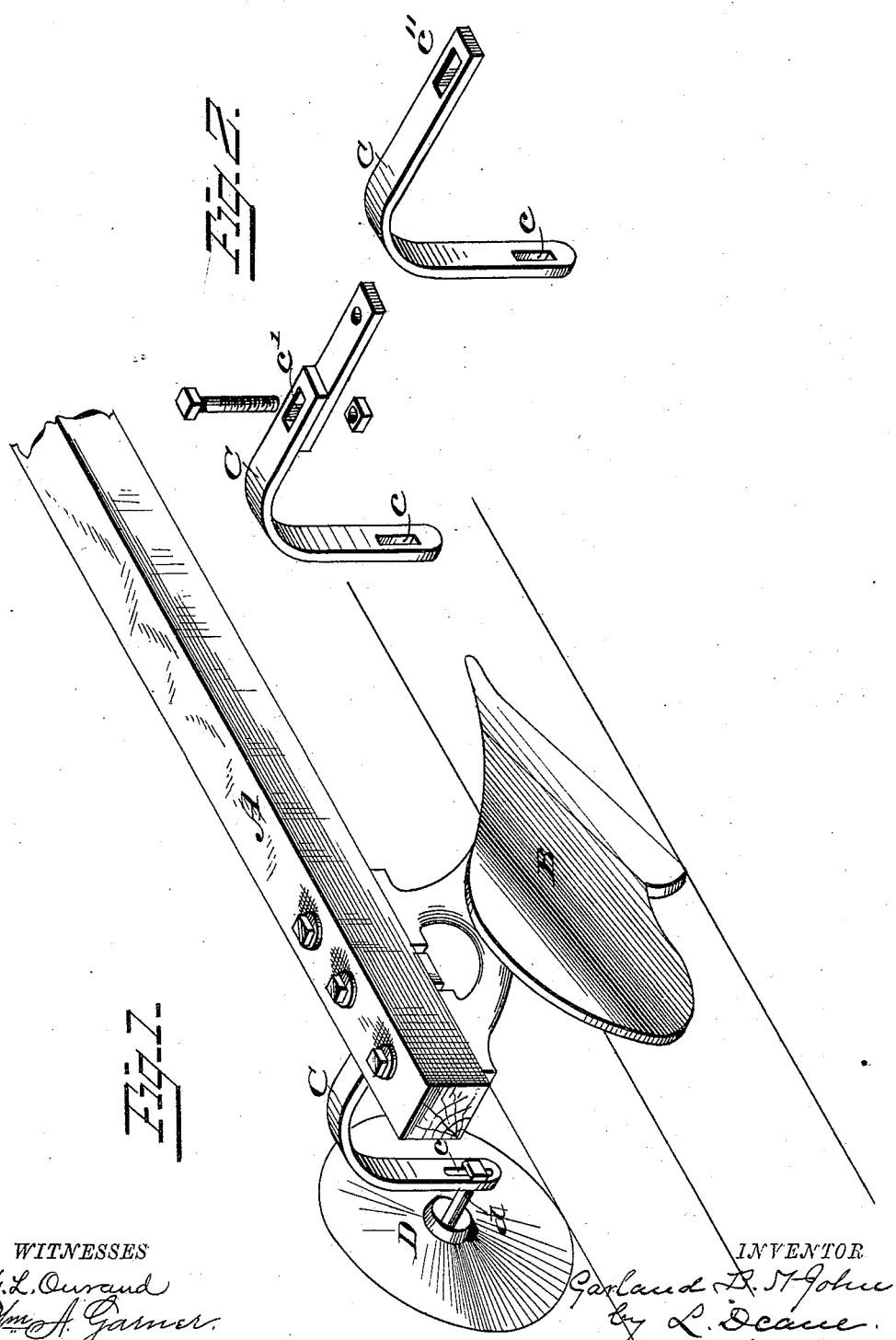

UNITED STATES PATENT OFFICE.

GARLAND B. ST. JOHN, OF CEDAR RAPIDS, IOWA.

ROLLING LANDSIDE-COLTER.

SPECIFICATION forming part of Letters Patent No. 287,336, dated October 23, 1883.

Application filed November 10, 1882. (No model.)

*To all whom it may concern:*

Be it known that I, GARLAND B. ST. JOHN, of Cedar Rapids, county of Linn, and State of Iowa, have invented certain new and useful Improvements in Rolling Landsides for Plows, of which the following is a specification, reference being had to the accompanying drawings, in which—

Figure 1 is a perspective view, showing the device as in use; Fig. 2, details showing modification of the axle-tree or arm on which the colter is mounted.

The object of this invention is to utilize the ordinary rolling colter to do the landside-work of the plow.

The nature of the invention consists in the vertically-adjustable revolving colter placed on the landward side of the plow, at a suitable distance therefrom, to cut the soil for a furrow in advance of the one being turned, all as will now be more fully set out and explained. The manner of connection to the plow is unimportant. It may be either connected to the truck of a wheel-plow by suitable adjustments by raising and lowering the colter, or arranged to connect upon the plow-standard provided with adjusting devices. I deem the manner shown in the accompanying drawings as simple and effective, a brief description of which I will give by reference to the said drawings.

A represents a beam, to which the plow B is connected by means of the ordinary standard. Connected at $c''$ by bolt and nut with said beam A is a projecting axle-tree, C, upon which the colter D is mounted. Said axle-tree may be provided with slots $c'$, so as to be adjusted laterally to get any desired width of furrow, and also with slots $c$, by which the colter may be adjusted vertically to get any required depth; or this adjustment can be made by placing the shaft $d$ of the colter D up or down, in or out of the slot $c$ of the axle-tree C, or in any other desired way or manner. The cutting of the colter, when set at the opposite side of the beam from the mold-board, tends to center the line of draft, and, working in the solid ground, holds the plow firmly to place.

I am aware that heretofore a revolving and adjustable colter has been used in connection with a plow to cut the next furrow. Therefore I do not broadly claim such a combination.

Having thus briefly described my invention, what I claim as new, and wish to secure by Letters Patent, is—

1. The vertically-adjustable revolving colter placed on the landward side of the plow, and opposite thereto and at a suitable distance therefrom, to cut the soil for a furrow in advance of the one being turned, substantially as described.

2. In combination with a plow having a roller-colter, as described, the arm C, extending at right angles from the beam, to the end of which the colter is attached, and whereby the colter is capable of horizontal and vertical adjustment, substantially as described.

GARLAND B. ST. JOHN.

Witnesses:
 FRANK G. CLARK,
 J. R. MEEK.